United States Patent [19]

Baird et al.

[11] Patent Number: 4,654,086

[45] Date of Patent: Mar. 31, 1987

[54] DISPERSIBLE XANTHAN GUM

[75] Inventors: John K. Baird, San Diego; Paul A. Sandford, Del Mar, both of Calif.

[73] Assignee: Merck & Co., Inc., Rahway, N.J.

[21] Appl. No.: 703,831

[22] Filed: Feb. 21, 1985

Related U.S. Application Data

[63] Continuation of Ser. No. 570,058, Jan. 12, 1984, abandoned.

[51] Int. Cl.$^4$ .............................................. C08L 5/00
[52] U.S. Cl. .................................... 106/206; 106/205; 106/208
[58] Field of Search ................. 106/181, 208, 205, 206

[56] References Cited

U.S. PATENT DOCUMENTS

| | | | |
|---|---|---|---|
| 3,456,050 | 7/1969 | Rieckmann | 106/162 |
| 3,503,895 | 11/1970 | Whelan | 106/181 |
| 3,639,564 | 2/1972 | Kawata | 106/162 |
| 3,657,182 | 4/1972 | Jolly | 260/33.4 |
| 3,723,334 | 3/1973 | Maurer | 252/181 |
| 3,755,529 | 8/1973 | Procyk | 252/363.5 |
| 3,882,029 | 5/1975 | Fischer et al. | 252/8.55 R |
| 3,989,632 | 11/1976 | Fischer et al. | 252/8.5 A |
| 4,192,753 | 3/1980 | Pye et al. | 252/8.5 A |
| 4,218,262 | 8/1980 | Warren | 106/208 |
| 4,231,802 | 11/1980 | McGinley et al. | 106/197 C |
| 4,278,692 | 7/1981 | Cassanelli et al. | 426/96 |
| 4,312,675 | 1/1982 | Pickens et al. | 106/171 |
| 4,341,563 | 7/1982 | Kurihara et al. | 106/171 |
| 4,363,669 | 12/1982 | Cottrell et al. | 106/208 |

FOREIGN PATENT DOCUMENTS 0007054 5/1979 European Pat. Off. .
0002085 1/1980 European Pat. Off. .

OTHER PUBLICATIONS

Derwent Publication Ltd., J5 4029-303, Earth Seiyaku KK, 5 Mar. 79.

*Primary Examiner*—Theodore Morris
*Attorney, Agent, or Firm*—Gabriel Lopez; Hesna J. Pfeiffer

[57] ABSTRACT

Xanthan gum is treated with surfactants. This treatment produces a readily dispersible xanthan gum.

7 Claims, No Drawings

DISPERSIBLE XANTHAN GUM

This is a continuation of application Ser. No. 570,058, filed Jan. 12, 1984, now abandoned.

BACKGROUND OF THE INVENTION

Xanthan gum has been used widely to prepare a variety of aqueous solutions having high viscosity and good suspending properties. A difficulty with xanthan gum in common with other high molecular weight, water soluble polymers has been its resistance to dispersibility and hydration. Typically, xanthan gum powder must be subjected to high agitation, as in a typical kitchen blender, to get it to disperse and hydrate.

Various approaches to the problem of preparing a dispersible xanthan gum have been described. For example, U.S. Pat. No. 4,357,260, Sandford, et al., describes the additiion of silica to a xanthan gum solution, which is then precipitated with a non-solvent, dried, and milled. U.S. Pat. No. 4,363,669, Cottrell et al., describes blends of glyoxal treated xanthan gum with certain non-dispersible plant gums.

SUMMARY OF THE INVENTION

It has now been found that the blending of certain surfactants with dry xanthan gum, optionally with the addition of sugar, produces a dispersible xanthan gum.

DETAILED DESCRIPTION OF THE INVENTION

Xanthan gum as used herein, refers to the biosynthetic polysaccharide produced by the organism *Xanthomonas campestris* by the whole culture fermentation of a medium comprising a fermentable carbohydrate, a nitrogen source, and appropriate other nutrients.

Xanthan gum preparation is described in numerous publications and patents, e.g., U.S. Pat. Nos. 3,671,398; 3,594,280; 3,591,578; 3,481,889 3,433,708; 3,427,226; 3,391,061; 3,391,060 3,271,267; 3,251,749; 3,020,206.

The surfactants of this invention are any of various food approved wetting agents such as acetylated monoglycerides, glycerol esters, lecithin, mono- and di-glycerides, polyglycerol esters, propylene glycol esters, polyoxyethylene sorbitan esters, sorbitan esters, sodium stearoyl-2-lactylate, stearyl-2-lactylic acid, and also other industrial surfactants, e.g. polyoxylstearates (e.g. Myrj-52). Combinations of two or more of these agents are also within the scope of this invention. The amount of surfactant can be reduced by the addition of sugar (e.g., sucrose, fructose, maltose, dextrose, maltodextrins, etc.) to the blend.

Several methods can be used to blend the various blend components. The surfactants are used in a liquid or dissolved state. For example, liquid (at room temperature) surfactants are added directly to xanthan gum powder and continually mixed as with a Hobart N-50 blender using a wire beater so as to substantially uniformly coat the xanthan gum particles. Sugar can then be blended in if desired to form a substantially homogeneous blend of coated xanthan gum and sugar. Solid surfactants are melted first and then the liquid surfactants are blended with the xanthan gum as above, optionally with sugar, as above. Instead of melting the solid surfactants, these can be dissolved in alcohol, such as isopropanol (IPA), and added to the xanthan gum as above. When the blending is completed the IPA is evaporated off as by gentle heating or forced aeration.

Pan agglomeration is a different technique for forming the blends of this invention. The two (or three) components are dry mixed and then tumbled on a rotating pan. The mix is treated with a fine mist while tumbling until the components form beads. These damp beads are then dried, as in a fluid bed dryer. The mist comprises water or a water/lower alcohol (e.g., IPA) mixture, with or without added surfactant. The beads generally have a mesh size ranging from about through 20 to on 80 mesh (U.S. standard sieves). A commercially available device for this process is The Ferrotech Pan Agglomerator, model FC 016-02 (Ferrotech Co., Wyandotte, Mich.).

The ratios of xanthan gum:surfactant within the scope of this invention range from 95:5 to 80:20 by weight. When sugar is used, the ratios are 20:0.5:80 to 20:5:80.

The dispersible blends of this invention are useful in all applications where it is desirable to use xanthan gum as a thickening agent, especially in consumer products which require in-home preparation by the end-user, such as dry-mixed salad dressings. A typical formulation for such a mix is:

|  | Parts by Weight |
| --- | --- |
| Salt/sugar/spices dry blend | 8.35 |
| Tap water | 12.81 |
| Vinegar (50 grain) | 56.23 |
| Vegetable oil | 130.00 |
| Gum/surfactant blend | 0.15 |

Dispersibility is evaluated by visual observation. Typically, a 0.5–1.0% blend (based on weight of xanthan gum) is added to the vortex of 150 ml Standard Tap Water (STW is a solution comprising 1000 ppm NaCl and 143 ppm $CaCl_2.2H_2O$ in deionized water) in a 300 ml beaker stirred with a magnetic bar at 500 rpm for 1 minute. This is compared to 0.5–1% untreated xanthan gum. The test blend is described as dispersible if there are fewer lumps than with untreated gum.

EXAMPLE 1

Two blends of xanthan gum and surfactant (90:10 and 85:15) were prepared as follows: Stearolac-S ® (sodium stearoyl-2-lactylate) was first melted before adding KELTROL ®F (xanthan gum, Kelco Div. of Merck & Co., Inc.). The mixture was stirred while hot for approximately 20 minutes using a Hobart mixer equipped with a wire whip. The mixture was then cooled and stirring continued until the Stearolac S resolidified giving a uniform coating on the xanthan gum.

These two blends were tested for dispersibility as follows: dispersibility (0.5% based on xanthan gum) was measured one minute after adding the sample to 150 ml STW in a 300 ml beaker. The solution was stirred (500 rpm, magnetic stir bar) for one minute. A "good" rating was given if the dispersibility was better than the untreated control (Keltrol F, xanthan gum). The data of Table 1-1 were obtained.

TABLE 1-1

| Sample | Rating |
| --- | --- |
| Untreated Control (0.5% x.g.) | Poor |
| 90/10 blend | Good |
| 85/15 blend | Good |

EXAMPLE 2

Sterolac-S was first melted before adding 200 g. xanthan gum. The mixture was stirred while hot for 20 minutes using a Hobart mixer equipped with a wire whip. The mixture was then cooled and stirring continued until the Sterolac-S resolidified giving a uniform coating on the xanthan gum particles. Two commercially available grades of xanthan gum were tested: KELTROL® and KELTROL®F.

Dispersibility (0.5% based on x.g.) was measured one minute after adding the sample (milled through 200 mesh for KELTROL®F xanthan gum and through 60 mesh for KELTROL® xanthan gum samples) to 150 ml STW in a 300 ml beaker. The solution was stirred (500 rpm, magnetic stir bar) for one minute. A "good" rating was given if the dispersibility was better than the untreated control. The data of Table 2-1 were obtained.

All blends hydrated to give essentially equivalent viscosities upon prolonged stirring demonstrating that blends were soluble.

TABLE 2-1

| | Amt. of blend used in test (g) | Disper. |
|---|---|---|
| 1. KELTROL/Stearolac-S(200:15) | 0.54 | good |
| 2. KELTROL/Stearolac-S(200:20) | 0.55 | good |
| 3. Untreated Control (KELTROL) | 0.5 | poor |
| 5. Untreated Control (KELTROL F) | 0.5 | poor |
| 6. KELTROL F/Stearolac-S(200:20) | 0.55 | good |

EXAMPLE 3

Dispersible blends were prepared by adding surfactants to xanthan gum (KELTROL®) prior to blending with sucrose. Two solid low melting point surfactants (Myrj-52®, a polyoxyl (40) stearate, and Tween-65®, a polysorbate-65) were first melted before adding to the xanthan gum whereas liquid surfactants (Tween 20® and Tween-80®) were added directly to xanthan gum. Uniform coating was achieved by mixing with the Hobart N-50 using the wire beater. The ratio of xanthan gum to surfactant was varied from 20/10 to 20/0.8 and varying amounts of sugar were added.

Dispersibility was measured (0.5% xanthan gum final concentration) one minute after adding material to be tested to 150 ml STW in a 300 ml beaker. The solution was stirred (500 rpm, magnetic stir bar) for one minute. An excellent rating was given if no lumps were present, a good rating if the number of lumps was significantly less than for the control, and fair if marginally less than the control. The data of Table 3-1 were obtained.

All blends hydrated to give essentially equivalent viscosities upon prolonged stirring demonstrating that the blends were soluble.

TABLE 3-1

| Blend | Ratio | Dispersibility |
|---|---|---|
| X.G.:Tween-20:sucrose | (20:10:80) | Excellent |
| :Tween-65:sucrose | (20:10:80) | Good |
| :Tween-80:sucrose | (20:10:80) | Good |
| :Myrj-52:sucrose | (20:10:80) | Excellent |
| X.G.:Tween-20:sucrose | (20:0.8:20) | Good |
| :Tween-65:sucrose | (20:0.8:20) | Good |
| :Tween-80:sucrose | (20:0.8:20) | Good |
| :Myrj-52:sucrose | (20:0.8:20) | Good |
| X.G.:Tween-80:sucrose | (200:5:800) | Good |
| | (200:10:800) | Good |

TABLE 3-1-continued

| Blend | Ratio | Dispersibility |
|---|---|---|
| | (200:20:800) | Good |
| | (200:5:0) | Poor |
| | (200:10:0) | Poor |
| X.G.:Stearolac-S:sucrose | (200:5:800) | Fair |
| | (200:10:800) | Fair |
| | (200:15:800) | Excellent |
| | (200:20:800) | Excellent |
| | (200:5:0) | Fair |
| | (200:10:0) | Fair |
| | (200:15:0) | Excellent |
| | (200:20:0) | Excellent |
| Controls | | |
| X.G.:surfactant:sugar | (200:0:0) | Poor |
| | (200:0:800) | Poor |

EXAMPLE 4

Dry blends of KELTROL-F® xanthan gum/-Stearolac-S®/sucrose were agglomerated using a rotary pan agglomerator. The pan agglomerator used comprised a 9" diameter dish, set at a 45° angle, and rotating at 20 rpm, capable of suitably holding 200 grams of blend. A fine mist of water was applied to the blend, while tumbling, that caused the product to bead. These damp beads were then dried in a fluid bed dryer and the beads (through 20 and on 80 mesh) were tested and evaluated for dispersibility. The controls were dry blends of xanthan gum and xanthan gum with sugar.

The data of Table 4-1 were obtained.

TABLE 4-1

| Blend composition | Ratios | Dispersibility |
|---|---|---|
| X.g.:Stearolac-S:sugar | 20:2:80 | Excellent |
| X.g.:Stearolac-S:sugar | 20:0:80 | Poor |
| X.g.:Stearolac-S:sugar | 20:0:0 | Poor |

What is claimed is:

1. A dispersible blend consisting essentially of xanthan gum and a surfactant which is one or more of lecithin, polyglycerol ester, propylene glycol ester, polyoxyethylene sorbitan ester, sorbitan ester, sodium stearoyl-2actylate, stearyl-2-lactylic acid, or polyoxylstearate, wherein the weight ratios of zanthan gum:surfactant range from 95:5 to 80:20.

2. A dispersible blend consisting essentially of zanthan gum, a surfactant and sugar, wherein the surfactant is one or more of lecithin, polyglycerol ester, polyoxyethylene sorbitan ester, sorbitan ester, sodium stearoyl-2-lactylate, stearyl-2-lactylic acid, or polyoxylstearate, and wherein the weight ratios of xanthan gum:surfactant:sugar range from 20:0.5:80 to 20:5:80.

3. A dispersible blend of claim 2 wherein the sugar is sucrose, fructose, maltose, dextrose, or maltodextrin.

4. A process for making xanthan gum dispersible which comprises coating xanthan gum powder with a surfactant which is either in a liquid or dissolved state therewith, said surfactant being one or more of lecithin, polyglycerol ester, propylene glycol ester, polyoxyethylene sorbitan ester, sorbitan ester, sodium stearoyl-2-lactylate, stearyl-2-lactylic acid, or polyoxylstearate.

5. A process for making xanthan gum dispersible which comprises pan agglomerating xanthan gum with a surfactant, said surfactant being one or more of lecithin, polyglycerol ester, propylene glycol ester, polyoxyethylene sorbitan ester, sorbitan ester, sodium stearoyl-2-lactylate, stearyl-2-lactylic acid, or polyoxylstearate.

6. A process of claim 4 which comprises coating xanthan gum powder with said surfactant and then blending sugar therewith.

7. A process of claim 5 which comprises pan agglomerating zanthan gum with said surfactant and sugar.

* * * * *